(12) United States Patent
Yoshida et al.

(10) Patent No.: US 6,438,445 B1
(45) Date of Patent: Aug. 20, 2002

(54) MACHINING PROCESSOR

(75) Inventors: Jun Yoshida; Akira Kawana; Shinichi Inoue; Tatsuya Hisaki, all of Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 09/155,883

(22) PCT Filed: Mar. 13, 1998

(86) PCT No.: PCT/JP98/01074
§ 371 (c)(1),
(2), (4) Date: Oct. 7, 1998

(87) PCT Pub. No.: WO98/41357
PCT Pub. Date: Sep. 24, 1998

(30) Foreign Application Priority Data

Mar. 15, 1997 (JP) .............................................. 9-082194

(51) Int. Cl.⁷ .............................................. G06F 19/00
(52) U.S. Cl. ........................ 700/173; 700/179; 700/180; 700/187
(58) Field of Search ................................. 700/186, 187, 700/193, 175, 172, 160, 173–179, 180, 182, 184, 191; 318/571; 702/44

(56) References Cited

U.S. PATENT DOCUMENTS

| | | | | |
|---|---|---|---|---|
| 4,698,573 A | * | 10/1987 | Niwa ......................... | 318/571 |
| 4,837,703 A | | 6/1989 | Kakazu et al. ......... | 364/474.18 |
| 5,400,260 A | * | 3/1995 | Matsumura et al. ........ | 700/180 |
| 5,796,618 A | * | 8/1998 | Maeda et al. ................ | 700/182 |
| 6,157,869 A | * | 12/2000 | Matsumura et al. ........ | 700/178 |

FOREIGN PATENT DOCUMENTS

| | | |
|---|---|---|
| EP | 0753805 A | 1/1999 |
| JP | 62-140741 | 6/1987 |
| JP | 62-241635 | 10/1987 |
| JP | 1-205954 | 8/1989 |
| JP | 2-178711 | 7/1990 |
| JP | 3-251907 | 11/1991 |
| JP | 3-294146 | 12/1991 |
| JP | 4-283047 | 10/1992 |
| JP | 4-284507 | 10/1992 |
| JP | 5-77138 | 3/1993 |
| JP | 6-102923 | 4/1994 |
| JP | 6-119029 | 4/1994 |
| JP | 6-138929 | 5/1994 |
| JP | 6-170694 | 6/1994 |
| JP | 8-132332 | 5/1996 |

* cited by examiner

Primary Examiner—Leo Picard
Assistant Examiner—Steven R. Garland
(74) Attorney, Agent, or Firm—J. Harold Nissen; Lackenbach Siegel

(57) ABSTRACT

A control apparatus 100 for a machine tool comprises input means 1 for inputting machining profile data 1a on the final profile of a work and workpiece data 1b on the material and profile of the workpiece to be machined, data storage means 3 for storing at least one of machine data representing machine specifications of the machine tool 11 for machining the work and tool data representing the specifications of the tools held in the machine tool, and tool path determining means 5 for generating a tool path for machining the work and determining the conditions for machining the work including the rotational speed of the main spindle and the feed rate of the machine tool 11 based on the data input from said input means and the data stored in said data storage means.

48 Claims, 10 Drawing Sheets

MACHINING AREA

MACHINING PROCESSOR

TECHNICAL FIELD

The present invention relates to a control apparatus for a machine tool and a machining system comprising the control apparatus and a machine tool wherein, by supplying a raw workpiece and inputting data regarding a machining profile of a final product (hereinafter referred to as machining profile data), the workpiece to be machined is machined according to the machining profile data so that a final product can be fabricated.

BACKGROUND ART

In the conventional method of machining a workpiece by a NC machine tool, the first step is to prepare a drawing representing the profile of a product to be machined. A programmer determines the machining steps from the drawing and creates a NC program manually or by an automatic programming unit. An operator inputs the NC program into the NC machine tool while, at the same time, setting up the workpiece on the NC machine tool manually or by using an automatic workpiece changer. Then, the cutting tool to be used is preset, and the amount of tool offset is defined. The cutting tool is then mounted in the tool magazine of the NC machine tool. After that, the NC program is executed thereby to machine the workpiece and fabricate a product. Various inventions have hitherto been developed with the aim of automating these steps as far as possible and reflecting the knowhow accumulated by programmers and operators on the machining steps.

First to be cited is an automatic programming system disclosed in Japanese Unexamined Patent Publication (Kokai) No. 4-315550. This system comprises profile recognition means for extracting a machining profile from the data representing the machining profile of a workpiece, a machining conditions memory for storing optimum machining conditions, and automatic machining conditions setting means for automatically setting optimum machining conditions stored in the machining conditions memory. As a result, machining conditions can be set automatically without the manual operation of setting the machining conditions by the operator, thus eliminating the human errors which often accompany manual operation and making a superior machining operation possible. Further, the load on the operator and the time required for the operator to tend to the machine are reduced.

A second conventional machining system is disclosed in Japanese Unexamined Patent Publication (Kokai) No. 4-138504. In this system, data on a workpiece including the material, surface roughness and the dimensional accuracy are stored beforehand and machining conditions are determined by a first neural network. The machining conditions can be corrected by the operator. This system further comprises learning means which, after an actual machining operation, corrects the machining conditions based on the machining result to produce corrected machining conditions while at the same time correcting the weight of the first neural network. The system furthermore comprises adaptive control means including a sensor for detecting the sparks, sound and the force generated during the machining process, and a second neural network supplied with the data from the sensor as temporal data in which the data is averaged with a predetermined time margin to detect the machining conditions at the moment thereby to correct the machining conditions dynamically. Even without a skilled operator, therefore, the workpiece can be machined under optimum machining conditions.

A third conventional technique concerns a method using the numerical control disclosed in Japanese Unexamined Patent Publication (Kokai) No. 9-26811. According to this method, a machining process and a machine tool are optimally selected in accordance with simplified input databased on the registration of various information files, the input of machining pattern data, the processing of a finish pattern, pattern recognition and the determination of the machining process. In this way, a machining area and machining steps high in production efficiency are selected, and tools, machining conditions and a tool path most suitable for the input patterns are determined. Both the production efficiency and the machining accuracy are improved further by post-machining measurement and correction.

Techniques are well known for automatically creating a tool path from the profile data of a product to be machined. An NC program can be automatically prepared by adding various machining conditions to the profile data. According to the first prior art described above, machining conditions are selected from a database in accordance with a predetermined algorithm based on the profile data of the product to be machined. These machining conditions can be considered static ones. In contrast, the second prior art is such that machining conditions which undergo a constant change are detected by a sensor, and the machining conditions set based on the detection result are adoptively controlled using the learning function of a neural network, so that dynamic machining conditions are determined in accordance with ever-changing machining requirements. The first and second prior art emphasize the automatic determination of machining conditions.

In the third conventional method, the operator inputs data, and machining conditions are automatically determined using a technique similar to the first and second prior art. In addition, automatic determination of a cutting tool and a tool path combined with a technique of measurement and correction after machining to finish an intended product without human labor.

These conventional techniques are based on the architecture of securing a high accuracy and a high production efficiency by feedback correction of the machining conditions, but not intended to realize a high-accuracy, high-efficiency machining process by predicting machining requirements and determining a tool path and machining conditions based on the prediction.

DISCLOSURE OF THE INVENTION

An object of the present invention is to provide a machine tool control apparatus and a machining system including the control apparatus and a machine tool, in which an intended product can be automatically machined at high efficiency while meeting the precision requirements in response to only profile data on the product to be finished and data on the workpiece to be machined.

Another object of the invention is to provide a machine tool control apparatus and a machining system including the control apparatus and a machine tool, in which machining requirements are predicted and a tool path and machining conditions are determined automatically in conformance with the predicted machining requirements, thus making possible a high-precision, high-speed machining process.

According to a first aspect of the invention, there is provided a machine tool control apparatus supplied with machining profile data for machining a workpiece, comprising input means for inputting workpiece data including machining profile data on a final workpiece profile and the material and the profile of the workpiece to be machined, data storage means for storing at least a selected one of machine data representing the specifications of the machine tool used for machining the workpiece and tool data representing the specifications of the tools held in the machine tool, and tool path determining means for generating a tool path for machining the workpiece and determining the conditions for machining the workpiece such as the rotational speed of the main spindle and the feed rate of the machine tool based on the data stored in the data storage means.

According to another aspect of the invention, there is provided a machining system supplied with the machining profile data for machining a workpiece, comprising: a machine tool for machining the workpiece; input means for inputting the machining profile data on the final profile of the workpiece and the material and profile of the workpiece to be machined; data storage means for storing at least a selected one of the machine data representing the specifications of the machine tool for machining the workpiece and the tool data representing the specifications of the tools held in the machine tool; predictive calculation means for predicting at least a machining load or interference between a tool and the workpiece based on the data input from the input means and the data stored in the data storage means; machining process determining means for selecting a tool and a machining pattern and determining a machining process based on the data input from the input means and the data stored in the data storage means; tool path determining means for generating a tool path for machining the workpiece and determining the conditions for machining the workpiece including the rotational speed of the main spindle and the feed rate of the machine tool based on the tool, the machining pattern and the machining process selected and determined by the machining process determining means, the result of predictive calculation made by the predictive calculation means, the data input by the input means and the data stored in the data storage means; and numerical control means for controlling the operation of the machine tool according to the tool path and the machining conditions generated and determined by the tool path determining means.

BRIEF DESCRIPTION OF THE DRAWINGS

FIGS. 5A to 5H are diagrams schematically showing the types of machining patterns.

FIGS. 8A and 8B are schematic diagrams for explaining the effects of the invention, in which

BEST MODE FOR CARRYING OUT THE INVENTION

Embodiments of the invention will be described with reference to the accompanying drawings.

Figure 1:
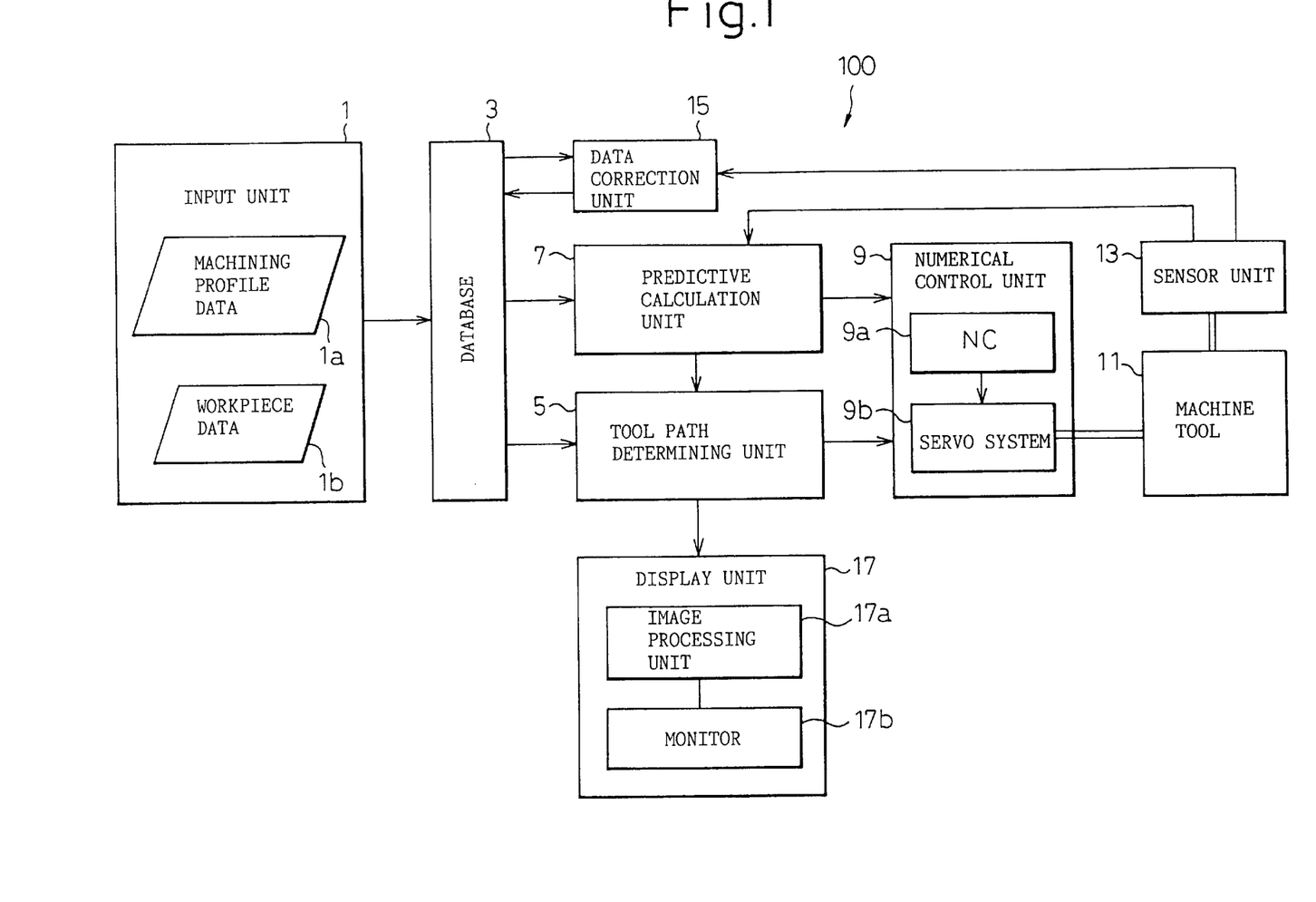
FIG. 1 is a block diagram showing a machine tool control apparatus according to an embodiment of the invention.

FIG. 1 is a block diagram showing a control apparatus 100 for a machine tool according to an embodiment of the present invention.

The control apparatus 100 includes, as main components thereof, an input unit 1, a database 3, a tool path determining unit 5 and a predictive calculation unit 7. Though not shown in detail, the control apparatus 100 can be configured of a CPU, a RAM, a ROM, an input/output interface, a data memory and a bidirectional bus for connecting these component elements.

The operator inputs the machining profile data 1a of a product to be machined from an input unit 1. This machining profile data 1a can be, for example, electronic pattern information such as CAD data. Also, the machining profile data 1a includes data on the machining accuracy and the surface roughness.

The input unit 1 is further supplied with workpiece data 1b providing data on the profile and the material of the workpiece to be machined for making the product. The workpiece data 1b include data on the dimensions and profiles of the fittings, jigs such as pallets, etc. for mounting and fixing the work on the machine tool 11, the mounting position on the machine tool 11 and the mounting position of the workpiece to be machined on a jig. The input unit 1 includes not only a keyboard but also such information media as a floppy disk and a magneto-optical disk, driving units thereof and an interface to a network which stores the data.

The data input by way of the input unit 1 are stored in the database 3 functioning as a data storage means. The database 3 includes a machine database 3a, a tool/holder database 3b, a machining conditions database 3c, a material database 3d, a NC/servo database 3e and an input database 3f. The database 3 can be configured of a data storage unit such as a hard disk drive or an optical disk device. The machine database 3a, the tool/holder database 3b, the machining conditions database 3c, the material database 3d, the NC/servo database 3e and the input database 3f in the database 3 can be configured either as different data storage units or can be incorporated in a single data storage unit partitioned into a plurality of areas assigned the databases 3a to 3f, respectively.

Figure 2:
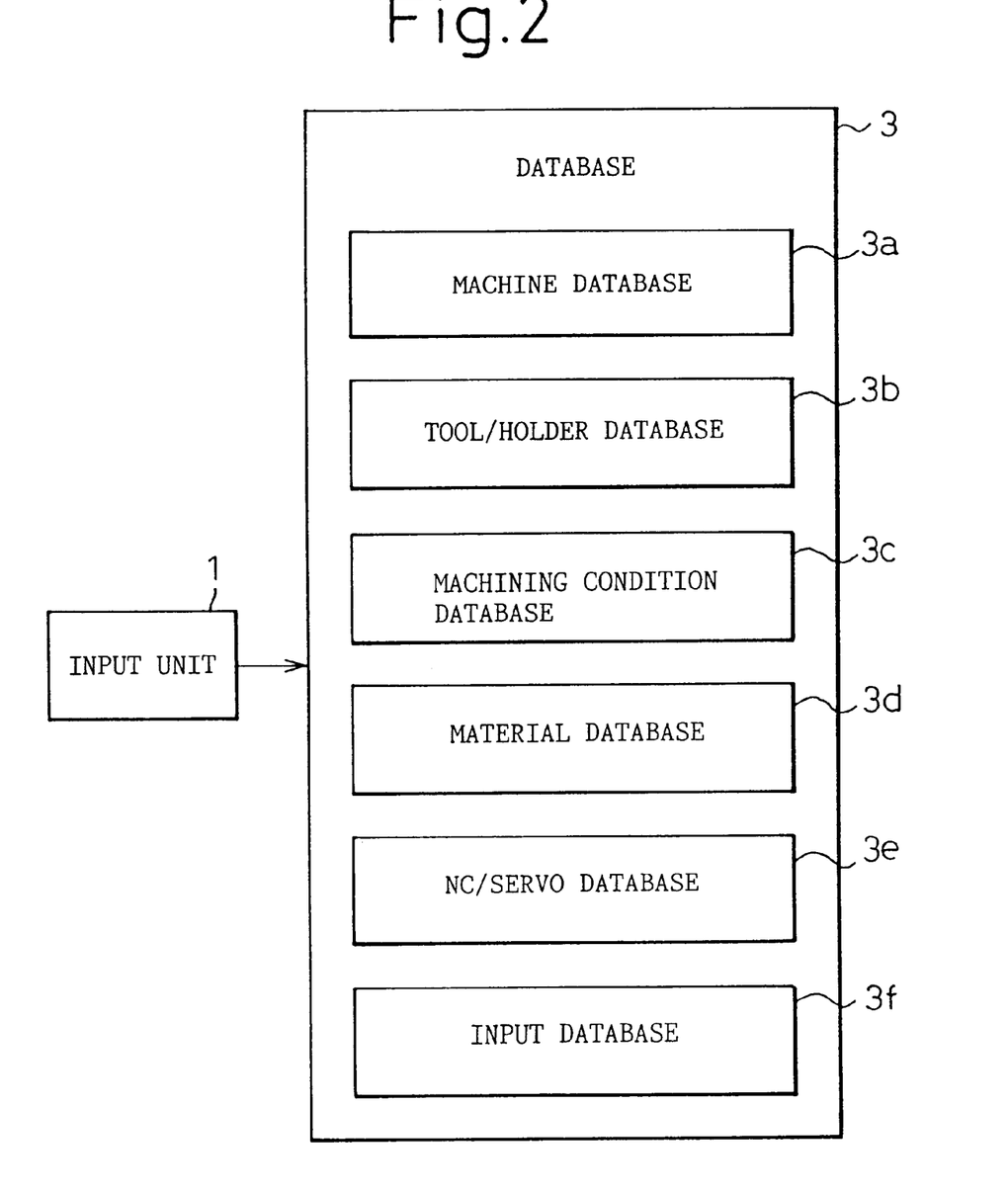
FIG. 2 is a block diagram showing a database.

With reference to FIG. 2, the data stored in the machine database 3a include those on the stroke of each feed shaft, the maximum rotational speed of the main spindle, and the maximum feed rate of the machine tool 11, and the deformation characteristic of the machine tool 11 with respect to temperature and the deformation characteristic of the machine tool 11 due to the weight of the work. The data stored in the tool/holder database 3b includes serial numbers of the tools, dimensions and the shape of the tool holder, material and life of the tools, the trip characteristic and the run-out characteristic of the tools under load, and the dimensions and shape of the forward end of the main spindle. The data stored in the machining conditions database 3c include the amount of feed and the amount of cut per blade, the pick feed amount, whether coolant is used or not, the machining pattern, the partitioning data for dividing the machining surface into a plurality of machining areas, and fundamental data for selecting an optimum tool for machining a given machining surface. The data stored in the material database 3d include the type, hardness, tensile strength, modulus of elasticity, etc. of a material. The data stored in the NC/servo database 3e include specifications, setup parameters, time constant of the servo, and the gain of the numerical control unit. The input database 3f has stored therein the machining profile data 1a and the workpiece data 1b input from the input unit 1.

The data stored in the database 3 are at least one of the data input arbitrarily by the operator, the data registered in the machine tool 11 and the data stored in a predetermined memory.

Figure 3:
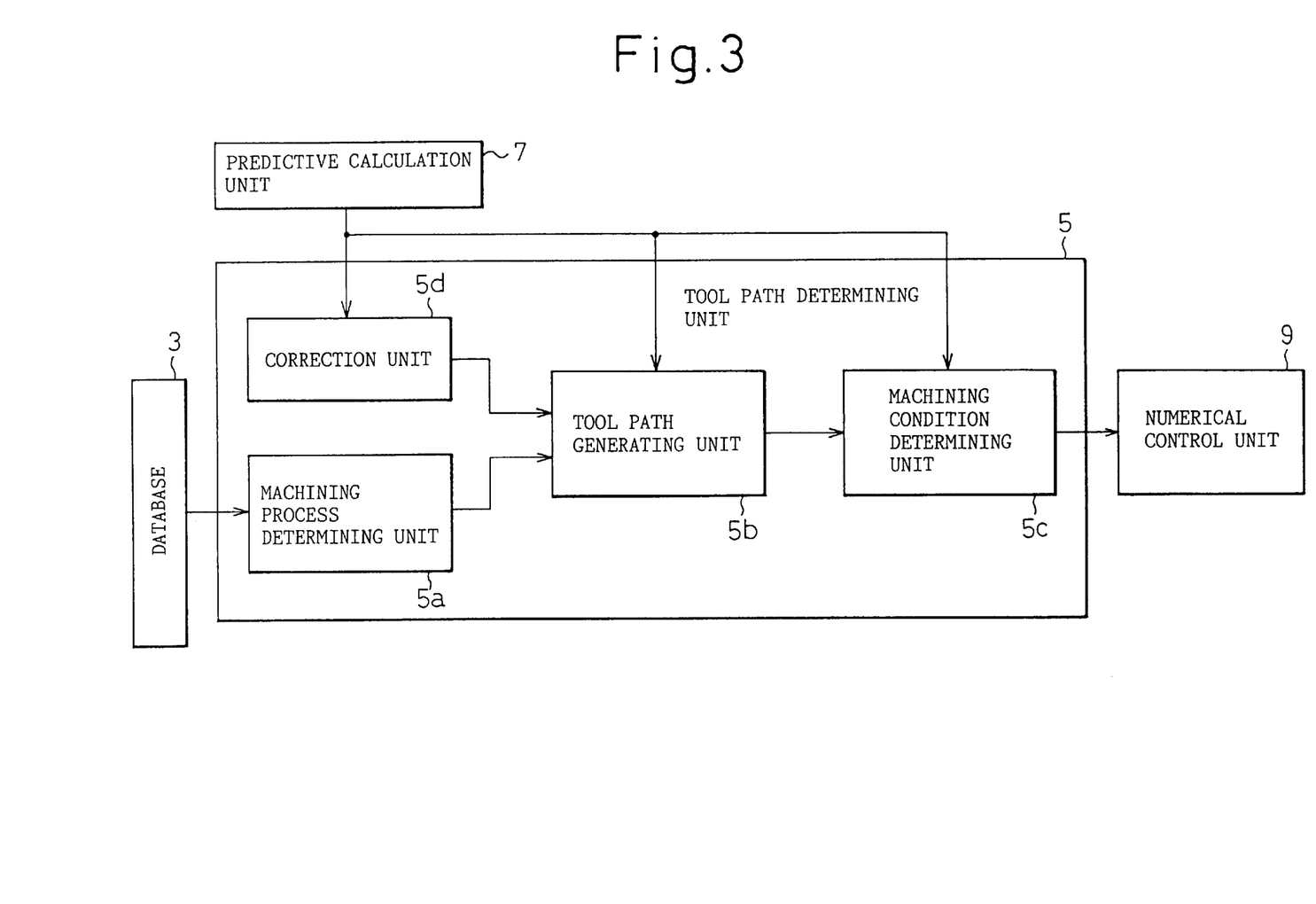
FIG. 3 is a block diagram showing a tool path determining unit.
Figure 4:
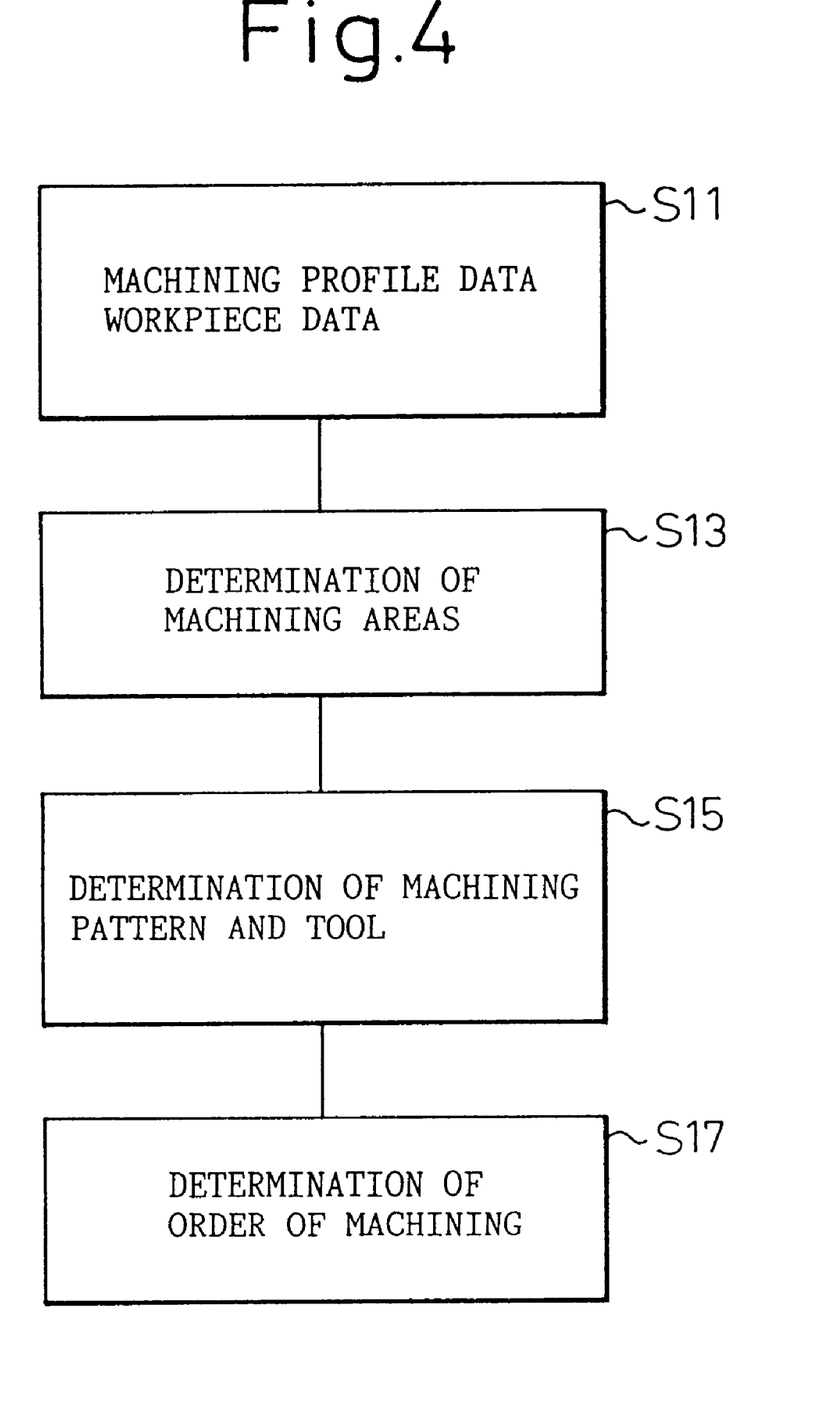
FIG. 4 is a flowchart for a machining process determining unit.

The tool path determining unit 5 will be described with reference to FIGS. 3 and 4.

The tool path determining unit 5 includes a machining process determining unit 5a, a tool path generating unit 5b, a machining conditions determining unit 5c and a correction unit 5d described in detail below.

First, the machining profile data 1a and the workpiece data 1b stored in the input database 3f are sent to the machining process determining unit 5a (step S11). Based on these data, the machining process determining unit 5a recognizes the profile of the machining surface of the workpiece to be machined and the work to be finished. Then, the machining process determining unit 5a partitions the machining surface into a plurality of machining areas with the curvature, the inclination and depth of the surface to be machined as surface parameters based on the surface partitioning data stored in the machining conditions database 3 and the recognized profile of the machining surface (step S13). Then, from among the fundamental data and the machining patterns stored in the machining conditions database 3c for selecting an optimum tool for machining surfaces, the machining process determining unit 5a selects an optimum tool and an optimum machining pattern for machining each machining area in accordance with each surface parameter thereof (step S15). In the case, where a steep slope is machined with a scan path for example, the tool would be overloaded or develop a shimmy. In order to prevent this, a machining path along a contour is selected for a steep slope. At the same time, the data on whether a cooling is required to be supplied or not is introduced from the machining conditions database 3c. Then, the order of machining the respective machining areas is determined (step S17).

Figure 5A:
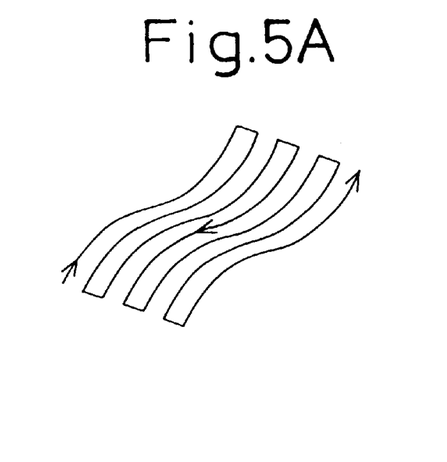
Figure 5B:
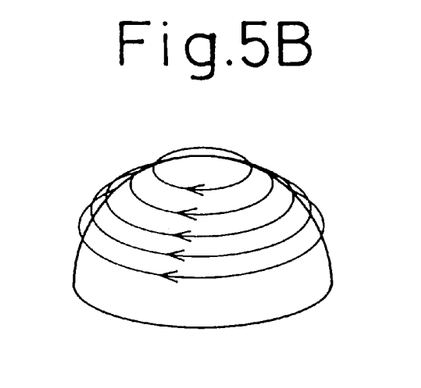
Figure 5C:
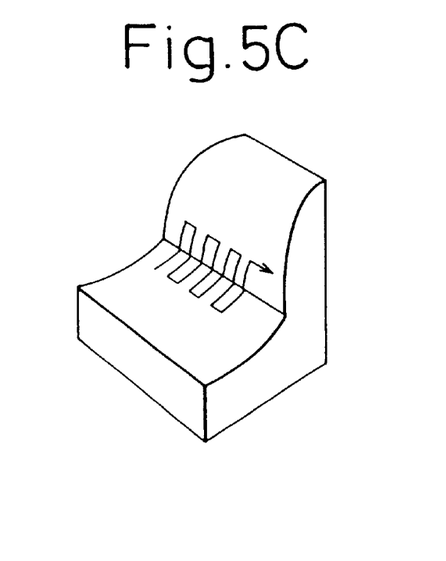
Figure 5D:
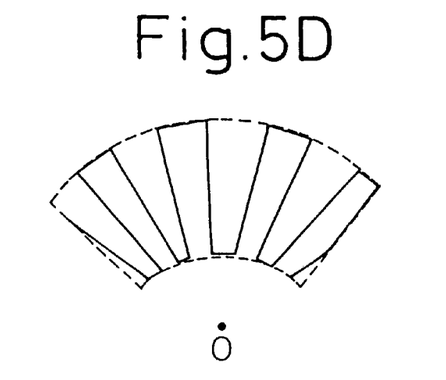
Figure 5E:
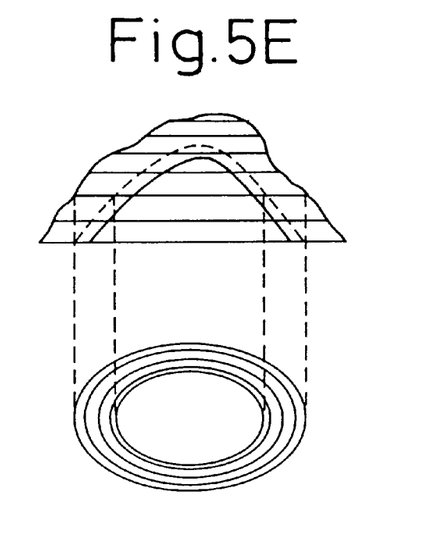
Figure 5F:
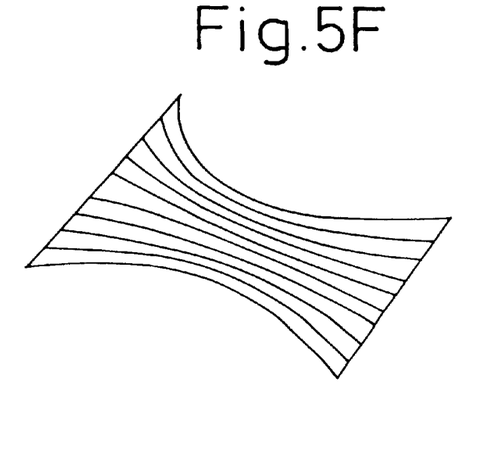

Examples of machining patterns are shown in FIGS. 5A to 5H. FIG. 5A shows a scan machining path, and FIG. 5B a contour machining path. FIG. 5C shows a scan machining path, i.e. what is called the character line machining path, intended to improve the cutting efficiency by setting only the portion having a work as a machining area, and FIG. 5D is a radiation machining path centered at about a point O. FIG. 5E shows a contour machining path for a work having a substantially predetermined stock allowance from a final profile of a material such as cast iron which is cutting a predetermined amount each time along the direction of the normal to the final profile by progressively offsetting the work, and FIG. 5F shows a scan machining path for a work having a substantially predetermined stock allowance from a final profile of a material such as cast iron which is cut a predetermined amount each time progressively along the direction of the normal to the final profile thereof.

Figure 5G:
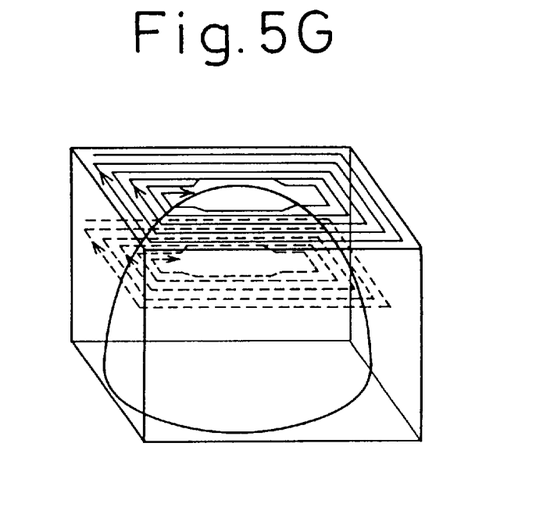
Figure 5H:
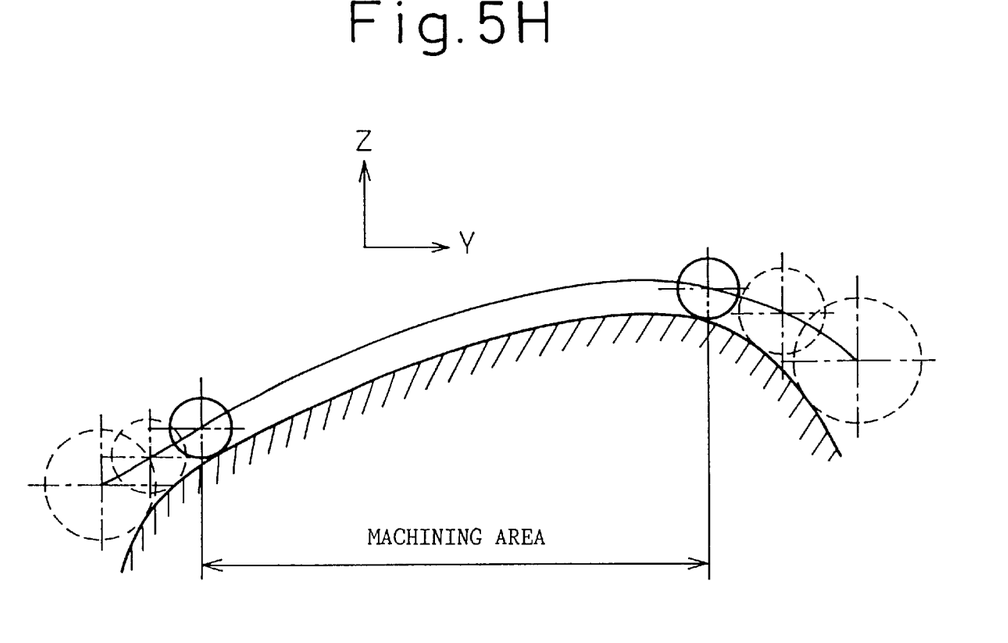

FIG. 5G shows a contour machining path intended to improve the cutting efficiency by defining a machining area only at the portion covered by a work, and starting the machining operation with the portion covered by a work or decreasing the pick feed rate when the work approaches a final profile, for example. FIG. 5H shows a machining path, in which the boundary of a machining area is overlapped automatically with an adjacent machining area, and the tool is retracted over the overlapped portion smoothly thereby to prevent a misalignment at the boundary. For example, the tool begins to be moved along the normal from a relief point a predetermined distance off the tool path associated with the size of the particular tool toward the machining area, within which the tool is moved along the tool path corresponding to the size of the particular tool to cut the machining area. These machining patterns are stored in the database 3 in a form reflecting the accumulated know-how in such a manner that a desired machining pattern can be selected for a corresponding surface parameter such as the curvature, inclination and depth of each machining area. The shown machining patterns represent only several examples to which the present invention is not limited.

The data determined in the machining process determining unit 5a on the machining area, the tool, the machining pattern and the machining sequence are sent to the tool path generating unit 5b. The tool path generating unit 5b determines optimum values of the feed rate per blade, the depth of cut and the pick feed length for machining a particular work from various amounts of these parameters stored in the machining conditions database 3c in correspondence with the data on the machining area, the tool, the machining pattern, the workpiece data 1b, in particular, the data on the material of the workpiece to be machined, stored in the input database 3f, and the data on the type, tensile strength and modulus of elasticity of the material stored in the material database 3d, while at the same time generating a tool path and a pick feed path. The tool path and the pick feed path are generated according to the formula stored in the machining conditions database 3c.

In place of the machining process determining unit 5a selecting and determining the tool, the machining pattern and the machining process, the operator can arbitrarily input the data on the tool, the machining pattern and the machining process.

Then, the machining conditions determining unit 5c determines the rotational speed of the main spindle and the feed rate of the machine tool 11 from the feed rate, the cut rate and the pick feed rate per blade based on the result of the calculation input from the tool path generating unit 5b, while at the same time applying a tool change command for each step of the process and a command for inserting a step of measurement by a sensor unit 13 described later to a numerical control unit 9.

The correction unit 5d issues a correction command to the tool path generating unit 5b or the machining process determining unit 5a based on the result of the predictive calculation input from the predictive calculation unit 7 described later.

Instead of determining the machining conditions in the machining conditions determining unit 5c, the machining conditions arbitrarily input by the operator or the machining conditions stored in a predetermined memory can be used with equal effect.

The numerical control unit 9 generally includes a well-known NC unit 9a and a servo system 9b having a servo motor and an amplifier for controlling the revolutions of the main spindle of the machine tool 11. Specifically, the NC unit 9a generates a command for moving each of the X, Y and Z feed shafts based on the tool path data and the machining conditions data, as is well known, while at the same time issuing commands for starting/stopping the main spindle, turning on/off the coolant, automatically changing the tool and automatically changing the pallet, etc. of the machine tool 11. The servo system 9b, in response to a move command from the NC unit 41, controls the servo motor of the feed shaft. In this way, the machine tool 11 is controlled by the numerical control unit 9.

The machine tool 11 is well-known equipment such as a machining center having an automatic tool changer, for example. The machine tool 11 comprises a sensor unit 13 including machine sensors having a temperature sensor such as thermistor for measuring the temperature of various parts of the machine such as the column and the bed, the coolant and the environment in which the machine tool 11 is installed, and an ampere meter for measuring the current value supplied to the motor of the machine tool 11, a tool sensor for measuring the length, diameter and the profile of the forward end of the tool mounted on the machine tool 11, and a work sensor for measuring the profile of the work being machined. The values detected by the sensor unit 13 are sent to the predictive calculation unit 7 described later. Further, the tool length, the tool diameter, the wobble of the tool in rotation, the off-center, etc. measured by the tool sensor of the sensor unit 13 are sent through the data correction unit 15 to the tool/holder database 3b of the database 3. Thus, the contents of the database 3, especially, the friction characteristic, the service life and the wobble characteristic of the tool are corrected and updated.

Also, the temperature of various parts of the machine body, the coolant temperature, the temperature of the environment, etc. measured by the temperature sensor included in the mechanical sensor of the sensor unit 13 are applied through the data correction unit 15 to the machine database 3a of the database 3, so that the related portion of the machine database 3a is corrected and updated. As an alternative, the positioning error of the machine tool 11 in operation is calculated from the machining error measured by the work sensor of the sensor unit 13, and applied through the data correction unit 15 to the machine database 3a of the database 3, so that the corresponding portion of the machine database 3a is corrected and updated. It is also possible to employ a method in which the machining error measured by the work sensor of the sensor unit 13 is sent to the correction unit 5d of the tool path determining unit 5 for generating correction data from the machining error data, and a corrected tool path is generated by the tool path generating unit 5b for re-machining.

Figure 6:
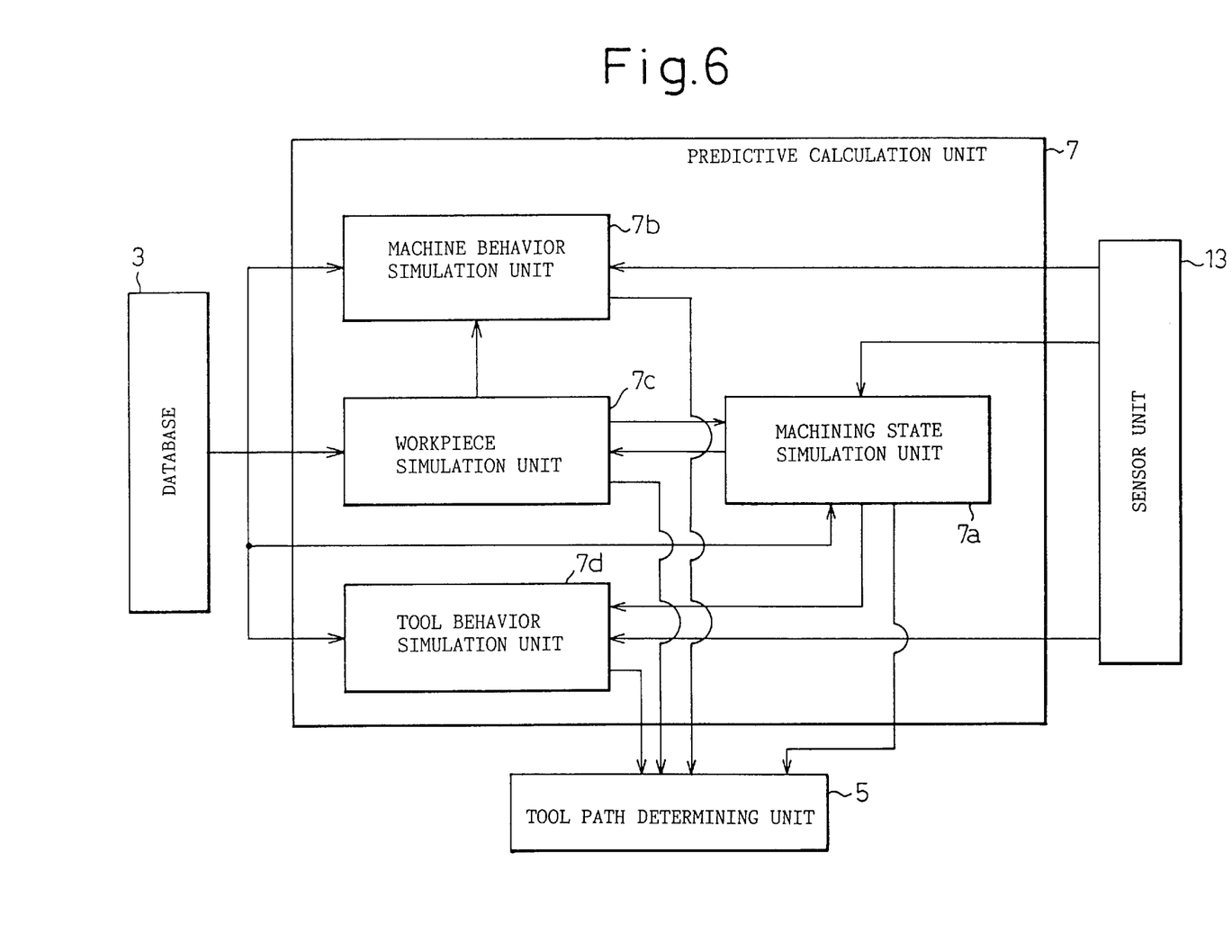
FIG. 6 is a block diagram showing a predictive calculation unit.

Now, the predictive calculation unit 7 will be described with reference to FIG. 6.

The predictive calculation unit includes, as main component elements thereof, a machining state simulation unit 7a, a machine behavior simulation unit 7b, a workpiece simulation unit 7c and a tool behavior simulation unit 7d.

The machining state simulation unit 7a receives the machining profile data 1a and the workpiece data 1b from the input database 3f, and the dimensions and the profile of the tool, the tool holder and the forward end of the main spindle determined by the machining process determining means 5a from the tool/holder database 3b. Further, the machining state simulation unit 7a receives the feed rate, the cut rate, the pick feed rate, the tool path and the pick feed path per blade determined and calculated by the tool path generating unit 5b and also receives the rotational speed of the main spindle and the feed rate determined by the machining conditions determining unit 5c.

The machining state simulation unit 7a, before starting the machining process, i.e. when the tool path determining unit 5 first generates a tool path or the like, predicts whether the tool, the tool holder or the forward end of the main spindle interferes with the work during the machining operation based on the machining profile data 1a, the workpiece data 1b, and the profile and dimensions of the tool, the tool holder and the forward end of the main spindle, the tool path and the pick feed path. In the case where interference is predicted during the machining operation in a given machining area, the machining state simulation unit 7a instructs the machining process determining unit 5a to define the same machining area as a no-machining area. In the case where the particular no-machining area can be machined by another tool or in the case where the machining pattern of the no-machining area can be changed, then the machining process determining unit 5a changes the tool or the machining pattern, as the case may be, determines the machining area, the tool, the machining pattern and the machining sequence afresh, and sends the result to the tool path determining unit 5. Then, this process is executed again. In the case where the tool or the machining pattern cannot be changed, on the other hand, the machining process determining unit 5a sends the machining sequence with the no-machining area removed from the machining process to the tool path determining unit 5.

Figure 7A:
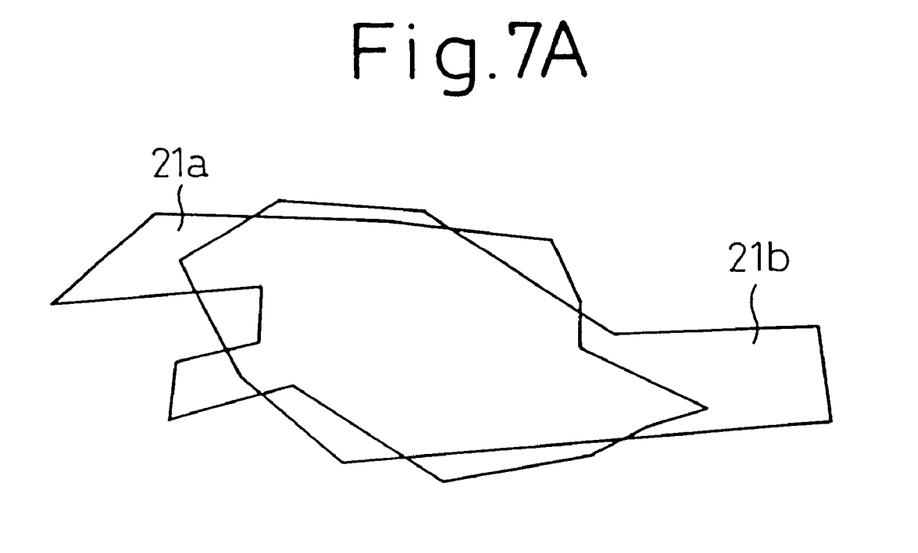
FIGS. 7A and 7B are schematic diagrams for explaining a method of determining a machining area.

An example of a method for determining a machining area will be explained with reference to FIGS. 7A, 7B. Assume that an area 21a free of interference with a given tool is predicted by calculations in the machining state simulation unit 7a and that an area that can be machined by the particular tool can be defined as an area 21b having a surface inclination of 66 degrees or less (FIG. 7A). The portion overlapped by the two areas is determined as a machining area 21c (FIG. 7B).

Figure 7B:
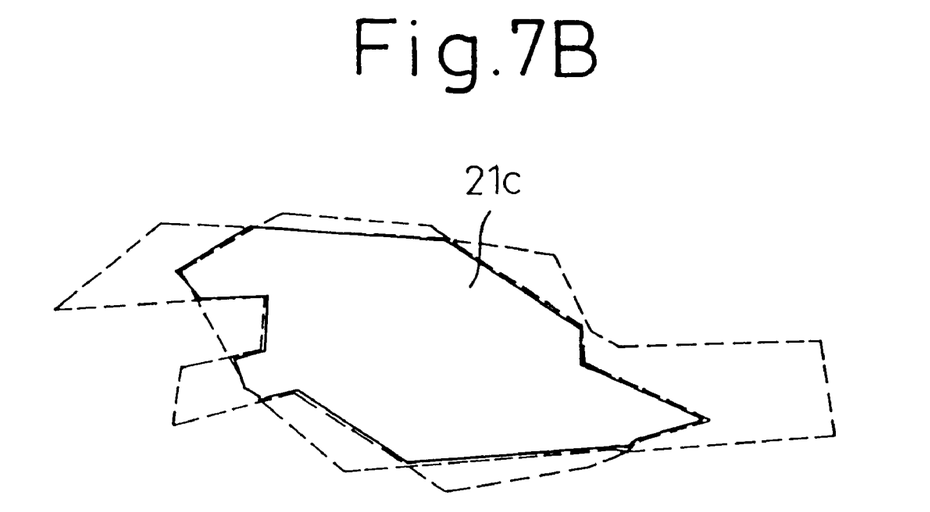

The machining process determining unit 5a can alternatively define a range to be machined as a portion overlapped between the machining area determined by checking for interference between the tool and the work as in the method shown in FIGS. 7A, 7B, the machining area arbitrarily determined by checking the machining profile data 1a input from the input unit 1 for any interference between the work and the tool and the machining area determined according to the surface inclination, the surface curvature and the depth included in the machining profile data 1a input from the input unit 1.

The machining state simulation unit 7a further checks, in real time, for a similar interference also after the machining process has started. In the case where interference between the tool and the work is predicted as a result of the check, a data indicating it is applied to the tool path generating unit 5b. The tool path generating unit 5b calculates and generates a machining route avoiding the interference such as along the Z-axis.

Also, the machining state simulation unit 7a predicts an internal-angle portion of the work being machined, based on the machining profile data 1, the workpiece data 1b, the machining pattern and the tool path while the actual machining work is going on. The result of prediction is applied to the machining conditions determining unit 5c, which generates machining conditions for decelerating the tool feed rate at the internal-angle portion.

Further, the machining state simulation unit 7a predicts by calculation a machining load from the workpiece data 1b, the feed rate, the cut rate, the pick feed rate and the tool path per bite determined and calculated by the tool path generating unit 5b, and the rotational speed of the main spindle and the feed rate determined by the machining conditions determining unit 5c. Furthermore, the machining state simulation unit 7a predicts the current profile or the work being machined, the contact point between the tool and the work and the weight of the work, from the machining profile data 1a, the workpiece data 1b, the profile and dimensions of the tool, the tool holder and the forward end of the main spindle determined by the machining process determining unit 5a, and the pick feed rate and the tool path determined and calculated by the tool path generating unit 5b.

Also, the machining state simulation unit 7a predicts the load inertia of the work based on the predicted work weight change and the machining conditions determined by the machining conditions determining unit 5c. The predicted load inertia is applied to the numerical control unit 9 for correcting the parameters of the servo system 9b of the numerical control unit 9.

In the case where what is called an "air cut" is predicted in which the work fails to be cut by the tool moving along a given tool path, based on the predicted contact point between the tool and the work, then the machining state simulation unit 7a sends data informing the machining conditions determining unit 5c of the fact. In response, the machining conditions determining unit 5c can give a command to the numerical control unit 9 to move the tool along the tool path at a maximum feed rate through the air-cut predicted area.

The machine behavior simulation unit 7b predicts the thermal deformation of the machine tool 11 based on the data on the thermal deformation characteristic of the machine against the temperature stored in the machine database 3a and the temperature data supplied from the temperature sensor of the sensor unit 13. Also, the machine behavior simulation unit 7b predicts the deformation of the machine tool 11 due to the work weight based on the work weight data predicted by calculation in the machining state simulation unit 7a and the deformation characteristic data of the machine under the weight of the work stored in the machine database 3a.

The workpiece simulation unit 7c receives the machining profile data 1a and the workpiece data 1b from the input database 3f, and receives, from the tool/holder database 3b, the dimensions and profile of the tool, the tool holder, and the forward end of the main spindle determined by the machining process determining unit 5a. Further, the workpiece simulation unit 7c receives the feed rate, the cut rate, the pick feed rate, the tool path and the pick feed path per blade determined and calculated by the tool path determining unit 5b, and also receives the rotational speed of the main spindle and the feed rate determined by the machining conditions determining unit 5c. The workpiece simulation unit 7c predicts by calculation an intermediate profile of the work being machined at each moment based on the data received from the database, and applies the result of predictive calculation to the machining state simulation unit 7a and the machine behavior simulation unit 7b.

The tool behavior simulation unit 7d predicts the trip and the run-out of the tool from the data on the machining load predicted by the machining state simulation unit 7a and the data on the trip and the runout characteristics with respect to the tool load stored in the tool/holder database 3b. Also, the tool behavior simulation unit 7d predicts by calculation the wear and the wear distribution of the tool from the data on the tool life stored in the tool/holder database 3b and the machining load, the machining contact point, the cut rate and the machining time predicted by the machining state simulation unit 7a. The wear distribution is defined as a prediction, for a ball end mill, for example, as to whether the forward end of the mill wears, and at which position the forward end wears, the straight portion or other portions. Based on this predictive calculation of the wear, the expiry of the service life of the tool is judged from the predictive calculation of the wear. Further, the tool sensor of the sensor unit 13 corrects the prediction value based on the change in the tool profile (diameter, length, center position, orientation, etc. of the tool) while turning.

The trip predictively calculated in the tool behavior simulation unit 7d is sent to the correction unit 5d of the tool path determining unit 5. In the case where the predicted tool trip is larger than a predetermined value, the tool generating unit 5b generates a tool path taking the tool trip into account. In the case where a large machining load is imposed for relatively moving the work and the tool to each other in the horizontal direction, for example, the tool is deformed in such a way as to trip forward in the direction of movement. Therefore, the movement of the forward end of the tool lags behind the coordinate of the main spindle. As a result, the feed rate is required to be corrected in such a manner that the forward end of the tool on the main spindle moves to a predetermined machining position in order to permit the required machining operation. A high-precision machining operation thus becomes possible.

Now, a display unit 17 will be explained. The display unit 17 includes an image processing unit 17a and a monitor 17b such as a CRT. The display unit 17 can display the machining area, the machining pattern, the profile and the serial number of the tool, etc. determined in the machining process determining unit 5a of the tool path determining unit 5. The image processing unit 17a receives the data on the curvature, the inclination and the depth of the machining area from the machining process determining unit 5a and can generate the data for displaying each area three-dimensionally in different colors. Further, though not shown in detail in FIG. 1, the image processing unit 17a is connected to the database 3, the predictive calculation unit 7, the numerical control unit 9 and the sensor unit 13 and thus can display the information from each of these component parts graphically or as a text. The display unit 17 can graphically display, for example, the result of the check for the work-tool interference based on the data from the predictive calculation unit 7. Further, the data on the machining accuracy included in the machining profile data 1a input to the input database 3f and the work profile measurement data obtained in the sensor unit 13 can be displayed in comparison with each other. Also, as described already, it is possible to graphically display the portion of the work remaining uncut by a machining path avoiding the work-tool interference.

The operation according to an embodiment of the invention will be described.

First, the operator inputs the machining profile data 1a and the workpiece data 1b from the input unit 1 into the database 3. According to the machining profile data 1a and the workpiece data 1b thus input and the data stored in the database 3, the tool path determining unit 5 selects and determines a machining area, a tool, a machining pattern and a machining process. Then, a tool path is determined by the tool path generating unit 5b of the tool path determining unit 5, and machining conditions by the machining conditions determining unit 5c. The machine tool 11 is driven under the control of the numerical control unit 9 according to the machine drive data including the tool path and the machining conditions generated and determined. In this way, the work is machined and a product is finished.

In the process, the predictive calculation unit 7 makes various calculations for predicting the machining load and the work-tool interference based on the machining profile data 1a and the workpiece data 1b input by the operator from the input unit 1 and the various data stored in the database 3. The result of predictive calculation is applied to the machining process determining unit 5a of the tool path determining unit 5. A tool, a machining pattern and a machining process are thus determined in the predictive calculation unit 7 according to the result of predictive calculation. In similar fashion, based on the result of predictive calculation in the predictive calculation unit 7, a tool path is determined by the tool path generating unit 5b of the tool path determining unit 5 and machining conditions by the machining conditions determining unit 5c.

As described above, according to this invention, various calculations are carried out in advance by the predictive calculation unit 7 for predicting the machining load, the interference between the work and the tool, etc. based on the machining profile data 1a and the workpiece data 1b input from the input unit 1 and the data stored in the database 3. In other words, unlike in the prior art in which a work is first machined followed by detection and feedback of the machining requirements in an attempt to control the operation optimally, the method according to the present invention starts with predictive calculations, and the result of-the predictive calculations is fed forward and used for machining the work. Also, the detected machining requirement is fed back for further improving the accuracy of the feedforward control. Consequently, the operation is optimized and the work can be machined with high accuracy and move quickly than in the prior art.

As can be seen from the foregoing description, according to this invention, the operator inputs only the profile data on the product to be machined and the data on the profile and material of the work to be loaded and machined. Thus, the operation of machining a work meeting the precision requirement can be automatically performed within a shorter length of time as a process meeting the required accuracy is executed automatically with a proper tool, along a proper tool path and under proper machining conditions.

Figure 8A:
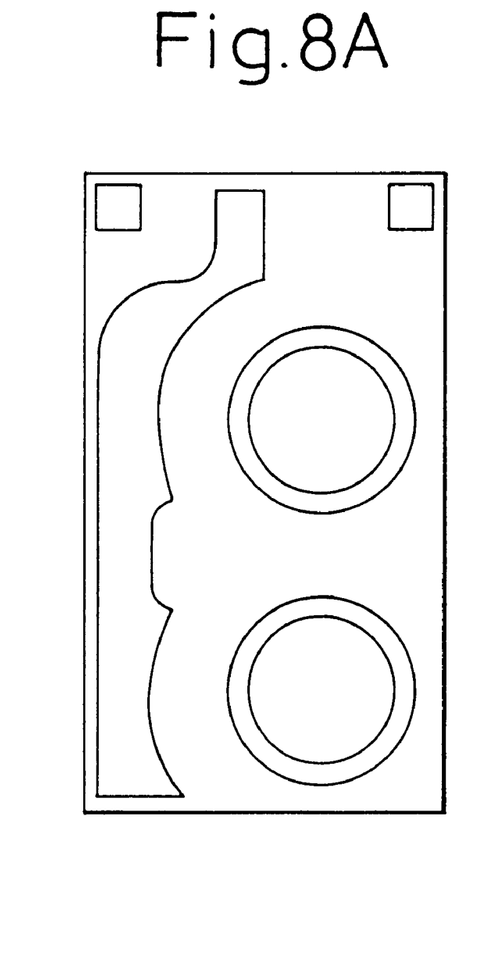
FIG. 8A shows a profile drawn based on the machining profile data input.
Figure 8B:
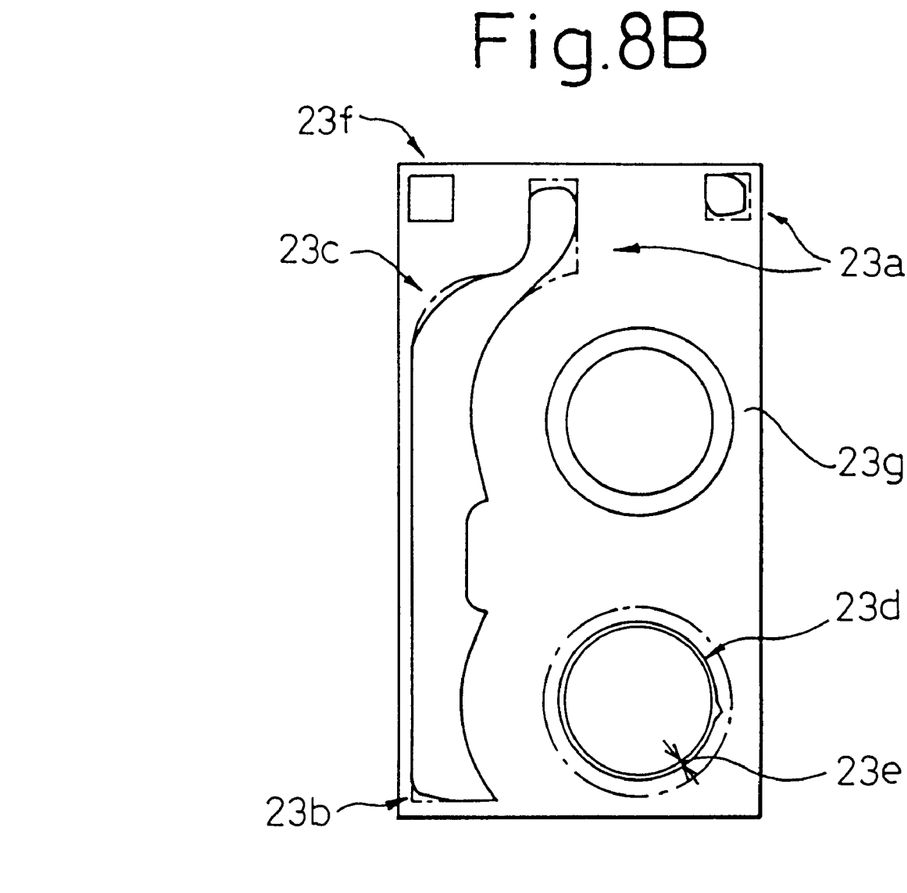
FIG. 8B is a diagram for comparing the results of machining by use of a control apparatus according to the invention and the prior art.

An example comparison between the prior art and the present invention is shown in FIGS. 8A, 8B. In the case where the machining profile databased on the drawing as shown in FIG. 8 is input, according to the prior art, assume that the feed rate of the tool is kept so high that the work is machined at 6 m/min, for example, in performing the machining operation. Corners are often undesirably dulled as shown by one-dot chain in FIG. 8B (the portions designated by reference numerals 23a, 23b) and the radius of curvature is shortened (the portion designated by numeral 23c). Further, according to the prior art, in the case where the tool is fed along a circumference at high speed, the true roundness is decreased as shown by numeral 23d or the thickness is increased as shown by numeral 23E. If the tool feed rate is reduced to, say, 200 mm/min in the prior art, on the other hand, a high-precision machining operation as shown by numerals 23f, 23g becomes possible. According to this invention, in contrast, as shown by solid line in FIG. 8B, the above-mentioned inconvenience is not caused even when the machining operation is performed with the tool kept fed at high speed. This can be achieved only by reason of the fact that the predictive calculation unit 9 calculates a predicted value of the machining load and checks for interference between the tool and the work in advance, and that various data stored in the database 3 are appropriately utilized.

We claim:

1. A machine tool control apparatus, with machining profile data input to machine a work, comprising:
    input means for inputting machining profile data on the final profile of a work and workpiece data on the material and the profile of the work before being machined;
    data storage means for storing machine data representing machine specifications of said machine tool for machining said work and/or specifications of cutting tools held in said machine tool;
    tool path determining means for generating a tool path for machining said work based on the machining profile data input from said input means and the machine data stored in said data storage means and determining the machining conditions including main spindle rotational speed and feed rate of said machine tool, for machining said work; and
    predictive calculation means for predicting a predictive calculation, through a calculation, a machining load based on the machining profile data input from said input means and the machine data stored in said data storage means.

2. A machine tool control apparatus according to claim 1, wherein the predictive calculation means further predicting an interference between a tool and a work based on the data input from said input means and the machine data stored in said data storage means.

3. A machine tool control apparatus according to claim 2, wherein said tool path determining means selects a tool and a machining pattern and includes machining process determining means for determining a machining process, and
    wherein said machining process determining means selects and determines a tool, a machining pattern and a machining process based on the profiled data input from said input means, the data machine stored in said data storage means and the result of predictive calculation by said predictive calculation means.

4. A machine tool control apparatus according to claim 3, wherein said tool path determining means determines machining conditions based on the machine data stored in said data storage means, the tool path generated, the result of predictive calculation by said predictive calculation means, and tool, machining pattern and machining process selected and determined by said machining process determining means.

5. A machine tool control apparatus according to claim 3, including display means wherein said machining process determining means instructs said display means to display an area incapable of being machined where the work is interfered with as determined by the tool-work interference check made by the predictive calculation means.

6. A machine tool control apparatus according to claim 3, including display means and wherein said machining process determining means arbitrarily sets a machining range in an area capable of being machined as determined by the tool-work interference check in said predictive calculation means and instructs said display means to display said set range.

7. A machine tool control apparatus according to claim 2, further comprising a machine sensor for detecting a temperature of the body of said machine tool and feeding back the result of said detection to said predictive calculation means.

8. A machine tool control apparatus according to claim 2, further comprising a tool sensor for detecting dimensions and profile of a cutting tool mounted in said machine tool and feeding back a result of said detection to said predictive calculation means.

9. A machine tool control apparatus according to claim 2, further comprising a machine sensor for detecting current flowing in a motor, temperature of the body of said machine tool, and a tool sensor for detecting dimensions and profile of a cutting tool mounted in said machine tool, wherein result of said detection is fed back to said predictive calculation means.

10. A machine tool control apparatus according to claim 9, wherein contents of a selected one of machine data and tool data stored in said data storage means are updated based on detection data of a selected one of said machine sensor and said tool sensor thereby to improve accuracy of the predictive calculation in said predictive calculation means.

11. A machine tool control apparatus according to claim 9, wherein said predictive calculation means includes:

work simulation means for predicting the profile of a work being machined, based on the workpiece data input from said input means, the machine data stored in said storage means and the tool path and the machining conditions generated and determined by said tool path determining means;

machine behavior simulation means for predicting the change in the machine tool position due to the temperature, the acceleration of the feed shaft, the relocation of the load, based on the data stored in said storage means and the detection data of said machine sensor; and tool behavior simulation means for predicting the length, diameter, trip, blade position, wear, of the tool in rotation, based on the data stored in said storage means and the detection data of said tool sensor;

wherein the result of predictive calculation in each of said simulation means is applied to said tool path determining means; and wherein said tool path determining means generates and determines a tool path and machining conditions conforming with the result of said predictive calculation in each of said simulation means.

12. A machine tool control apparatus according to claim 2, wherein said predictive calculation means includes work simulation means for predicting a profile of the work being machined based on the workpiece data input from said input means, the machine data stored in said data storage means and the tool path and the machining conditions generated and determined in said tool path determining means.

13. A machine tool control apparatus according to claim 12, wherein said machine tool includes numerical control means and said data storage means further has stored therein material data including the hardness, tensile strength and modulus of elasticity of various materials of the work, wherein said predictive calculation means predicts the weight change of the work based on the profile data of the work being machined and the material data stored in said data storage means, and further predicts a load inertia based on the predicted work weight change and the machining conditions determined by said tool path determining means, and wherein the predicted load inertia is applied to said numerical control means, for correcting parameters.

14. A machine tool control apparatus according to claim 13, wherein said predictive calculation means recognizes current machining process and required accuracy, and applies the recognized machining process and the required accuracy to said numerical control means, and instructs said numerical control means to correct the parameters.

15. A machine tool control apparatus according to claim 12, wherein said predictive calculation means checks for interference between a tool and a work based on the predicted profile of the work being machined in said work simulation means.

16. A machine tool control apparatus according to claim 2, including a machine sensor for detecting data of temperature wherein said predictive calculation means includes machine behavior simulation means for predicting change in machine tool position due to temperature, feed shaft acceleration, load relocation, based on the machine data stored in said storage means and the detection data of said machine sensor.

17. A machine tool control apparatus according to claim 16, wherein the machine behavior simulation means of said predictive calculation means outputs a selected one of thermal deformation amount of said machine tool actually measured during machining operation and thermal deformation amount predicted by calculation based on detection data of said machine sensor to said tool path determining means, thereby instructing said tool path determining means to generate a tool path not deteriorating machining accuracy which might otherwise be caused by the thermal deformation of said machine tool.

18. A machine tool control apparatus according to claim 2, including a tool sensor wherein said predictive calculation means includes tool behavior simulation means for predicting the length, diameter, trip, blade position, wear, of the tool in rotation based on the predicted machine load, data stored in said data storage means and the detection data of said tool sensor.

19. A machine tool control apparatus according to claim 18, wherein said tool behavior simulation means of said predictive calculation means predicts by calculation trip, wear, of said tool and outputs the result of said predictive calculation to said tool path determining means, thereby instructing said tool path determining means to generate a tool path not deteriorating the machining accuracy which might otherwise be caused by the trip or wear of said tool.

20. A machine tool control apparatus according to claim 2, wherein said predictive calculation means predicts by calculation a machining load and applies the result of said predictive calculation to said tool path generating means thereby to generate a tool path for reducing tool deformation due to the machining load predicted by said tool path determining means.

21. A machine tool control apparatus according to claim 2, wherein said predictive calculation means predicts an air-cut area where the tool fails to cut the work based on the machining profile data and the workpiece data input from said input means, and wherein said tool path determining means determines the machining conditions for moving the tool at a maximum feed rate in said air-cut area.

22. A machine tool control apparatus according to claim 2, wherein said predictive-calculation means predicts an air-cut area where the tool fails to cut the work based on the machining profile data and the workpiece data input from said input means, and wherein said tool path generating means generates a tool path skipping said air-cut route.

23. A machine tool control apparatus according to claim 2, wherein said predictive calculation means predicts an internal-angle portion of the work being machined, based on the machining profile data and the workpiece data input from said input means, applies the result of said prediction to said tool path determining means, and determines the machining conditions for decelerating the feed rate at said internal-angle portion.

24. A machine tool control apparatus according to claim 2, wherein, after determining machining area selected based on the workpiece data and the work profile data input from said input means and a tool for machining said machining area, said predictive calculation means checks for interference between the tool and the work in said machining area, and wherein said machining process determining means determines said machining area as an area capable of being machined in the absence of interference and determines said machining area as an area incapable of being machined in the presence of interference, as determined by said calculation of interference prediction.

25. A machine tool control apparatus according to claim 2, wherein said predictive calculation means checks the machining profile data input from said input means for interference between a tool and a work arbitrarily determined, determines an area capable of being machined where no interference occurs and an area incapable of being machined where interference occurs, and determines said area capable of being machined as a range to be machined.

26. A machine tool control apparatus according to claim 2, wherein said predictive calculation means determines, as a range to be machined, an overlapped portion between a machining area determined by the check for interference between the tool and the work or a machining area determined arbitrarily by checking the machining profile data input from said input means for interference between the tool and the work on the one hand and a machining area determined based on surface inclination, surface curvature and depth in the machining profile data input from said input means on the other hand.

27. A machine tool control apparatus according to claim 1, wherein the machine data stored in said data storage means includes at least a selected one of arbitrarily selected data input arbitrarily by the operator, machine tool data registered in said machine tool and beforehand stored data stored beforehand in a predetermined memory means.

28. A machine tool control apparatus according to claim 1, wherein said tool path determining means selects a tool and a machining pattern and includes machining process determining means for determining a machining process.

29. A machine tool control apparatus according to claim 28, wherein tool data, machining pattern data and machining process data selected and determined by said machining process determining means are data arbitrarily input by the operator.

30. A machine tool control apparatus according to claim 28, wherein said machining process determining means recognizes surface inclination in the machining profile data input from said input means and discriminates the machining areas based on the difference in said surface inclination.

31. A machine tool control apparatus according to claim 30, further comprising display means for displaying different machining areas in different colors.

32. A machine tool control apparatus according to claim 28, wherein said machining process determining means recognizes surface curvature in the machining profile data input from said input means and discriminates machining areas according to difference in said surface curvature.

33. A machine tool control apparatus according to claim 32, further comprising display means for displaying different machining areas in different colors.

34. A machine tool control apparatus according to claim 28, wherein said machining process determining means recognizes depth of the machining profile data input from said input means and discriminates each machining area according to difference in depth of the machining profile data.

35. A machine tool control apparatus according to claim 34, further comprising display means for displaying different machining areas in different colors.

36. A machine tool control apparatus according to claim 1, wherein the machining conditions determined by said tool path determining means are at least a selected one of arbitrarily data input arbitrarily by the operator and data stored beforehand in a predetermined memory means.

37. A machine tool control apparatus according to claim 1, further comprising machining profile measuring means for measuring a profile of a product machined, wherein result of measurement is fed back to said tool path determining means thereby to correct the tool path for improving the machining accuracy.

38. A machine tool control apparatus according to claim 37, wherein the contents of the machine data stored in said data storage means are updated based on result of measurement by said machining profile measuring means thereby to improve accuracy of the predictive calculation in said predictive calculation means.

39. A machine tool control apparatus according to claim 1, wherein said tool path determining means recognizes the machining profile data and the workpiece data input from said input means and generates a tool path having a machining area only in a selected contour machining pattern where work exists.

40. A machine tool control apparatus according to claim 1, wherein said tool path determining means recognizes the machining profile data and the workpiece data input from said input means and generates a tool path which includes a set of selected contour machining patterns, a tool is fed along one of the contour machining patterns and then fed in the normal direction relative to the workpiece to a next contour machining pattern when a preceding contour machining pattern is finished.

41. A machine tool control apparatus according to claim 1, wherein said tool path determining means recognizes the machining profile data and the workpiece data input from said input means and generates a tool path having a machining area only where work exists in a selected scan machining pattern.

42. A machine tool control apparatus according to claim 1, wherein said tool path determining means recognizes the machining profile data and the workpiece data input from said input means and generates a tool path which includes a set of selected scanning machining patterns, a tool is fed along one of the scanning machining patterns and then fed in the normal direction relative to the workpiece to a next scanning machining pattern when the preceding scanning machining pattern is finished.

43. A machine tool control apparatus according to claim 1, wherein said tool path determining means recognizes the machining profile data and the workpiece data input from said input means and generates a tool path for preventing a tool deceleration at an internal-angle portion of the work in a selected contour machining pattern.

44. A machine tool control apparatus according to claim 1, wherein said tool path determining means recognizes the machining profile data and the workpiece data input from said input means and generates a tool path for preventing a tool deceleration at an internal-angle portion of the work in a selected scan machining pattern.

45. A machine tool control apparatus according to claim 1, wherein said tool path determining means recognizes the machining profile data and the workpiece data input from said input means, starts to move the tool from a relief point at a distance off a tool path associated with size of the tool out of said machining area in the direction along the normal toward said machining area, moves said tool along a tool path associated with said tool size in said machining area, and thereby generates a tool path for performing the machining operation in said machining area.

46. A machining system supplied with machining profile data for machining a work, comprising:

input means for inputting machining profile data for the final work profile and workpiece data for the material and profile of a workpiece to be machined;

data storage means for storing at least a selected one of machine data representing specifications of a machine tool for machining said work and tool data representing the specifications of the tools held in said machine tool;

predictive calculation means for predicting at least a selected one of a machining load and interference between a tool and a work based on the data input from said input means and the data stored in said data storage means;

machining process determining means for selecting a tool and a machining pattern and determining a machining process based on the result of predictive calculation by said predictive calculation means, the data input from said input means and the data stored in said data storage means;

tool path determining means for generating a tool path for machining said work based on the tool, the machining pattern and the machining process selected and determined by said machining process determining means, the result of predictive calculation by said predictive calculation means, the data input by said input means and the data stored in said data storage means, and determining the conditions for machining said work including spindle rotational speed and feed rate of said machine tool; and numerical control means for controlling the operation of said machine tool according to the tool path and the machining conditions generated and determined by said tool path determining means.

47. A machine tool control apparatus supplied with a work and machining profile data for machining said work to the desired profile based on said machining profile data, comprising:

input means for inputting said machining profile data and workpiece data including material data and profile data of the work;

data storage means for storing at least a selected one of machine data representing the machine specifications including feed shaft stroke, main spindle rotational speed and feed rate of the machine tool for machining the work, control data including various parameters for a numerical control unit for controlling said machine tool, and tool data representing the tool specifications including the type, material and dimensions of the tools held in the machine tool;

predictive calculation means for predicting at least a selected one of a machining load, the interference between a tool and a work and the contact point of a tool in machining operation based on the data input from said input means and the data stored in said data storage means;

machining process determining means for selecting at least a tool and a machining pattern and determining a machining process based on the result of predictive calculation by said predictive calculation means, the data input from said input means and the data stored in said data storage means;

tool path generating means for generating a tool path for machining said work based on the tool, the machining pattern and the machining process selected and determined by said machining process determining means, the data input from said input means, the data stored in said data storage means and the result of predictive calculation by said predictive calculation means;

machining conditions determining means for determining the conditions for machining said work including the tool path generated by said tool path generating means, the data stored in said data storage means and the result of predictive calculation by said predictive calculation means; and numerical control means for controlling the operation of said machine tool according to the tool path generated by said tool path generating means and the machining conditions determined by said machining conditions determining means.

48. A machining system supplied with a work and machining profile data for machining said work into the desired profile based on said machining profile data, a machine tool for machining said work, and outputting a machined product;

input means for inputting in advance said machining profile data and workpiece data on the material and profile of the work;

data storage means for storing at least a selected one of machine data representing the machine specifications including feed shaft stroke, the rotational speed of a main spindle and feed rate of said machine tool for machining said work, control data including various parameters for the numerical control unit for controlling said machine tool and tool data representing the tool specifications including the type, material and dimensions of the tools held in said machine tool;

predictive calculation means for predicting at least a selected one of a machining load, the interference between a tool and a work and the contact point of a tool in machining operation based on the data input from said input means and the data stored in said data storage means;

machining process determining means for selecting at least a tool and a machining pattern and determining a machining process based on the result of predictive calculation by said predictive calculation means, the data input from said input means and the data stored in said data storage means;

tool path generating means for generating a tool path for machining said work based on the tool, the machining pattern and the machining process selected and determined by said machining process determining means, the data input from said input means, the data stored in said data storage means and the result of predictive calculation by said predictive calculation means;

machining conditions determining means for determining the conditions for machining said work including main spindle rotational speed and feed rate of said machine tool based on the tool path generated by said tool path generating means, the data stored in said data storage means and the result of predictive calculation by said predictive calculation means; and numerical control means for controlling the operation of the machine tool of said machining system according to the tool path generated by said tool path generating means and the machining conditions determined by said machining conditions determining means.

* * * * *